J. F. DODGE.
MECHANIC'S LEVEL.
APPLICATION FILED SEPT. 30, 1920.
1,418,544.
Patented June 6, 1922.
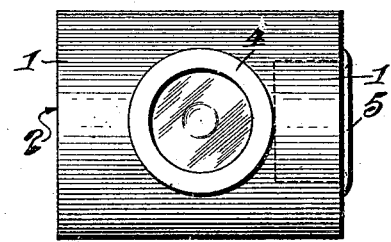
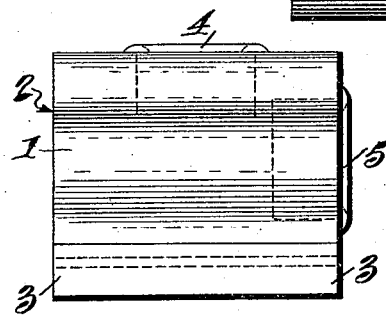
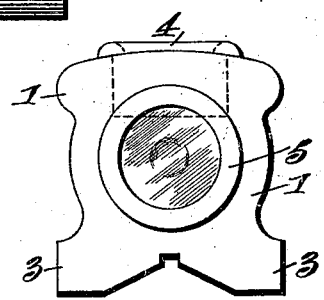
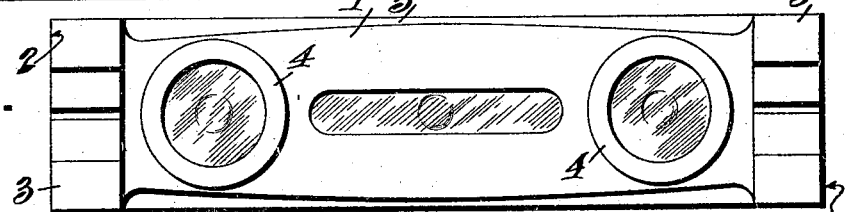
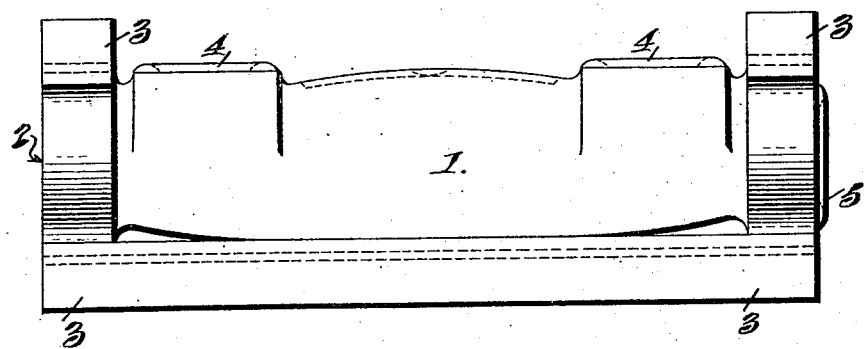
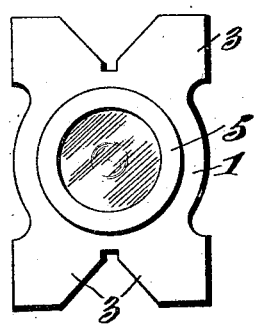
INVENTOR
John F. Dodge.
BY
Fred J. Dieterich
ATTORNEYS

UNITED STATES PATENT OFFICE.

JOHN F. DODGE, OF HAZLETON, PENNSYLVANIA.

MECHANIC'S LEVEL.

1,418,544.  Specification of Letters Patent.  Patented June 6, 1922.

Application filed September 30, 1920. Serial No. 413,908.

*To all whom it may concern:*

Be it known that I, JOHN F. DODGE, a citizen of the United States, residing at Hazleton, in the county of Luzerne and State of Pennsylvania, have invented a new and useful Mechanic's Level, of which the following is a specification.

My invention has for its purpose to provide a new and improved construction of level, which is simple and durable, effective in operation and which is more especially designed for use by carpenters and other mechanics for leveling up any given object.

My invention more particularly comprehends a leveling device of the general character stated, in which the operating parts are compactly arranged, in which the levels are in the nature of box levels and so disposed whereby the movement of the air bubble in every direction can be ascertained at a glance and the time consumed by frequent movement in order to test the object, as is the case in other forms of levels, is entirely avoided.

Again, my improved level embodies certain features of construction, whereby an overhead object may be conveniently leveled by the workman from below the object and the need of getting above the work to effect the desired leveling is overcome.

Furthermore, my invention has for its purpose to provide a new and improved leveling device of medium sensibility and which serves to measure the horizontal and vertical of straight and round objects; the said device in its complete form being of such size that it can be easily carried about.

With other objects in view and which will hereinafter be referred to, my invention embodies, in an instrument of the character stated, the peculiar features of construction and novel combination of parts, fully explained in the following detailed description, specifically stated in the appended claims and illustrated in the accompanying drawings, in which:

Figures 1, 2 and 3 are respectively a top plan, side elevation, and an end elevation of the simplest form of my improved level, Figure 4 is a top plan view, Figure 5 is a side elevation, and Figure 6 is an end elevation of a somewhat modified arrangement of my invention hereinafter specifically referred to.

In carrying out my invention in its simplest form, same comprises a body 1 of any suitable material, one end 2 of which is a perfect right angle to the base 3.

Centrally of the top of the body 1 is located a spirit level 4 contained in a suitable box secured in the said top and in true parallelism with the base 3.

5 indicates a similar spirit level located in one end of the body and in perfect parallelism with the opposite base end 2 and in a true right angle to the top box level 4.

In the modified form of my invention, as is shown in Figures 4, 5 and 6, the same characteristics appear as in the simplest form shown in Figures 1, 2 and 3, the latter or modified form being especially designed for a precision spirit level.

For such purpose, the top of the body 1 has a round box level 4 at each end and a tube level located between the end levels and in longitudinal direction along the top.

From the foregoing description taken in connection with the drawings, the complete construction and the use of my leveling device will be readily apparent to those familiar with the handling of instruments of this character.

The simplest form of my invention, shown in Figures 1, 2 and 3, is of small compact construction of medium sensibility and the size is such that it may be easily carried about but not so small so it loses any of its practical value.

In its simplest form, my level serves to measure the horizontal and the vertical of straight and round objects, the form thereof being such that the work of leveling can be accomplished more quickly than with levels of the old construction, since the time consumed in frequent moving of the device is reduced to the minimum.

With my type of level, either of the spirit levels may be used for leveling the horizontal or vertical lines of the object to be tested and for leveling square corners, the same can be quickly set with its end and bottom base faces in the corner angle.

Should either line of the angle be out of true, the deflection is noticed at a glance from either the under side or the outer end of the device.

For leveling overhead objects, the device is especially useful, since there is no necessity of going above the work, as is usually the case, since the reading and the adjustment can be readily provided for by reading from below.

The use of the level is extremely simple, the smoothed base, either the bottom or end, is placed on the object to be tested.

If the air bubble is exactly in the center of the ring, then the surface of the object engaged by the instrument is a true horizontal (or vertical).

If the air bubble stands outside of the center, then the object is too high on the side on which the air bubble stands, it being understood the air bubble naturally gravitates to the highest point.

The modified form of my invention, shown in Figures 4, 5 and 6, is used the same as is the other or simpler forms.

The supplemental or tube level used in connection with the two circular end or box levels provides for greater accuracy, since the box levels act as a check on the tube level and vice versa.

What I claim is:

1. A level of the character described, comprising a body having a horizontal bottom base, a box level in the top of the said body in parallelism with the horizontal base and an end base at a perfect right angle to the bottom base and a box level located on the other end of the body in parallelism with the opposite end base and at right angles to the other aforesaid level.

2. A level of the character described, comprising a body having a horizontal bottom base, a pair of box levels in the top of said body in parallelism with the horizontal base and a spirit level in the top of said body in parallelism with the horizontal base, said body having an end base at a perfect right angle to the bottom base and a box level located on the other end of the body in parallelism with the opposite end base and at right angles to the other aforesaid levels.

JOHN F. DODGE.